INVENTORS
ALLAN E. WILLIAMS
LESLIE M. DYSON
LOWELL F. MATTHIES by Thomas W. Brennan

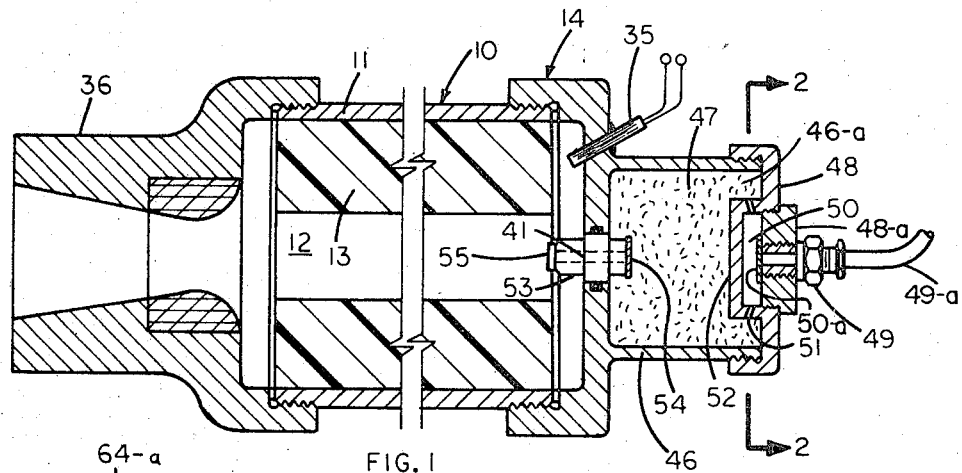
FIG. 1
FIG. 2
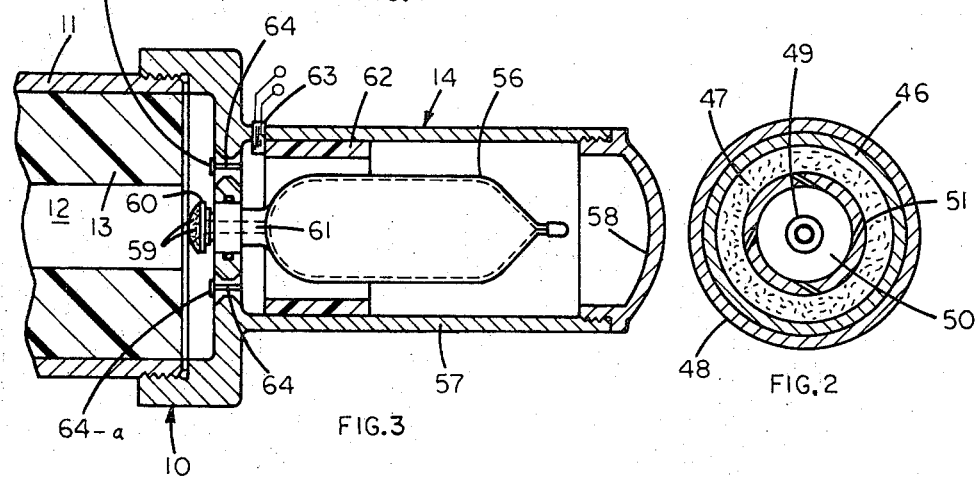
FIG. 3
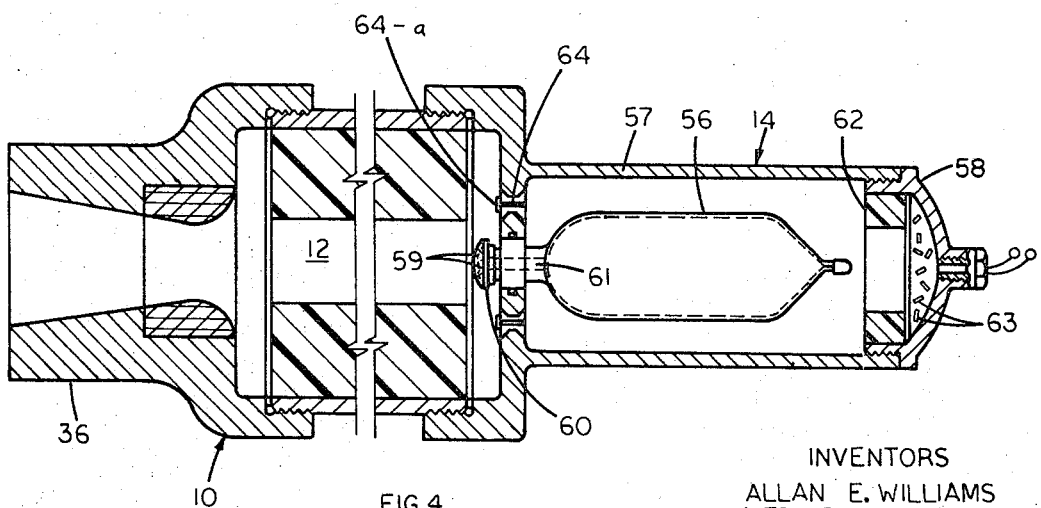
FIG. 4
INVENTORS
ALLAN E. WILLIAMS
LESLIE M. DYSON
LOWELL F. MATTHIES
by Thomas W. Brennan Oct. 31, 1967  A. E. WILLIAMS ET AL  3,349,562
HIGH ENERGY ADDITIVE ADDITION MEANS FOR A ROCKET MOTOR Original Filed Oct. 23, 1964  2 Sheets-Sheet 2

United States Patent Office 3,349,562
Patented Oct. 31, 1967

3,349,562
HIGH ENERGY ADDITIVE ADDITION MEANS
FOR A ROCKET MOTOR
Allan E. Williams and Leslie M. Dyson, Elkton, Md., and Lowell F. Matthies, Washington's Crossing, Pa., assignors to Thiokol Chemical Corporation, Bristol, Pa., a corporation of Delaware
Original applications Oct. 23, 1964, Ser. No. 406,039, now Patent No. 3,296,801, and June 1, 1966, Ser. No. 554,398, the latter application which in turn is a division of the first-mentioned application. Divided and this application Jan. 5, 1967, Ser. No. 607,464
9 Claims. (Cl. 60—251)

ABSTRACT OF THE DISCLOSURE

A high performance solid propellant rocket motor having a separable, hermetically sealed, head end attached assembly for supplying particulated high energy material to the motor combustion chamber in a fluid medium. The material is supplied from the assembly by various ways including combustible fluid entrainment, gas entrainment from a combustible charge gas generator, extrudable slurries and/or pastes from a collapsible container in the supply assembly, and volatilizable liquid stored in an internally positioned container in the supply assembly.

This application is a division of copending applications Ser. No. 406,039, filed Oct. 23, 1964, of Allan E. Williams et al., now Patent No. 3,296,801, and Ser. No. 554,398, filed June 1, 1966, of Allan E. Williams et al., which in turn is a division of the first mentioned application.

This invention relates to solid propellant rocket motors, and more particularly to solid propellant rocket motors wherein high energy additives are brought into contact with the propellant charge at time of initiation of operation or shortly thereafter, being sealingly separated under all other, non-operating conditions.

In one of its several aspects, additives of a composition suitable for combustion in the chamber of a rocket motor, preferably a solid propellant rocket motor, are supplied from hermetically sealed means after or during motor start up. Other aspects will be alluded to and described in the following specification which has for its most important object to provide a solid propellant charge containing rocket motor having a casing defining a combustion chamber, means for initiating combustion of the charge in the chamber, and an exhaust nozzle for rearwardly expelling the gaseous products of combustion of the propellant charge to produce a thrusting force wherein high energy producing, chemically active additives are introduced simultaneously with, or shortly after, initiation of combustion from a separable supply assembly, thereby resulting in a safe, reliable, and storable high performance motor.

Another object of the invention is to provide a motor of the character described wherein the separable supply assembly is hermetically sealed from the motor propellant charge until, at a predetermined time or set of conditions is obtained, they are thereafter transferred to the combustion zone of the motor.

Still another object of the invention is to provide a motor of the type referred to wherein the performance of the motor is enhanced by energy augmenting additives supplied in a fluid medium to the motor combustion chamber simultaneously or shortly after initiation of combustion therein from a separable, hermetically sealed supply assembly.

A still further object of the invention is to provide a rocket motor of the type described wherein the performance enhancing additives are supplied from said supply means in a slurry or paste which is pressure fed or extruded into the combustion chamber simultaneously with, or shortly after, initiation of combustion therein.

An additional object of the invention is to provide a rocket motor of the character described wherein the performance enhancing additives are particulated materials embedded and dispersed in a combustible material charge in a separable, hermetically sealed, auxiliary casing mounted on the head end of the motor which is thereafter ignited, producing gas for ignition of the main propellant charge in the combustion chamber of the motor and which acts as a fluid carrier for the particulated materials.

Other objects, features and advantages of the invention will be more fully apparent to those skilled in the art from the following detailed description taken in connection with the accompanying drawings in which like reference characters refer to like parts throughout and wherein:

FIGURE 1 is a sectional view of one embodiment of the invention illustrative of a separable fluidization means for supplying additives wherein the fluid carrier is externally supplied under pressure;

FIGURE 2 is a sectional view of the invention of FIGURE 1 taken on line 2—2 thereof;

FIGURE 3 is a partial, sectional view of another embodiment of the invention illustrative of an internally supplied fluidization and pressurization means for supplying additives;

FIGURE 4 is a sectional view of the embodiment of the invention illustrated in FIGURE 3 illustrative of an alternate pressurization means;

Figure 5:
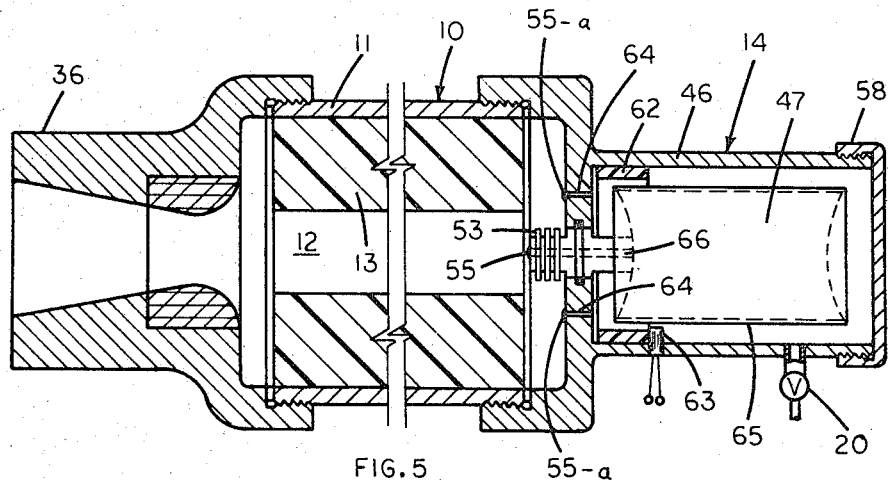
FIGURE 5 is a sectional view of a still further embodiment of the invention illustrative of still another fluidization and pressurization means for supplying additives.

In its broadest aspects, the invention comprises a rocket motor of the solid propellant type wherein means is provided to permit operation at a higher performance level than heretofore possible, and wherein the means is in the form of consumable or combustible additives which are supplied from a separable hermetically sealed assembly and transported to the main solid propellant at initiation of combustion thereof or shortly thereafter. In the prior art, solid propellant ingredients, including additives are usually mixed or pre-mixed during the manufacture (of ingredients) or the loading phase of the motor casing, which after solidifying, results in the additives becoming embedded therein. Additives of various types, for example, the metals aluminum, zirconium, nickel, lithium, sodium, potassium, titanium, magnesium, beryllium, zinc, iron, manganese, vanadium, copper, chromium, hafnium, rubidium, cesium, calcium, strontium, barium and alloys thereof and the near metals or metalloids carbon, boron, tellurium, silicon, selenium, sulfur, phosphorous, and the like are used as burning rate modifiers and/or catalysts and as primary fuels to enhance overall performance and specific impulse. Other materials such as hydrogen containing compounds and nitrogen are used as diluents to modify the temperature of the exhaust gases. Choice of additives, therefore, usually depends on their compatibilty with the propellant ingredients for safe handling and storage over long periods. And where the products of combustion become toxic (e.g., beryllium) because of the additives, use and creation of special facilities and/or safety precautions become mandatory. Other disadvantages are also encountered, for example, violent reactions due to exposure to certain types of environmental conditions, for example, high ambient temperature, subjection of the motor to sudden shocks during handling, etc. These disadvantages generally are outweighed by the superior performance obtainable from many additives, especially the metallic ones, but in the larger motors contemplated for use and presently in use today, these problems are becoming relatively insurmountable. Added thereto is the fact that present day motors use propellants which are quite energetic and contain highly reactive ingredients, especially oxidizers, and even in the solid state condition inside a rocket motor casing are not unknown to react during storage. In addition, many materials found most useful as additives are either themselves quite reactive or become reactive in conjunction with the oxidizer of the propellant. There results, therefore, a generally untenable situation wherein use of the motors within a very (relatively speaking) short time after manufacture is practically mandatory. If short time use is impractical, then it must be disposed of or otherwise destroyed as unsafe for storage. This, of course, results in needless expense and limits the usefulness of the motor.

This invention, however, obviates most of these problems by presenting methods and apparatuses for separating from the motor propellant until near the instant of use (i.e., at initiation of firing or shortly thereafter), these additive materials which are applicable to even the very large motors under safe and reliable operational conditions while remaining capable of demonstratably yielding the desired superperformance sought after by present day rocket motor designers.

Referring now to the drawings, and in particular to FIGURE 1, there is shown a solid propellant rocket motor 10 comprising a cylindrical casing 11 defining a combustion chamber 12. Chamber 12 contains a solid propellant charge 13 which upon ignition, combusts to provide propelling or thrust producing gas upon expulsion from nozzle exit cone 36. Separably attached to motor 10 at the head end thereof is a hermetically sealed particulated material supply assembly 14 comprising a cylindrical, auxiliary casing 46 (shown in FIGURE 1 as threadably coupled to casing 11 for convenience), an end cap 48 threadably attached to auxiliary casing 46, and a chamber 46a containing particulated high energy additive material 47. End cap 48 has a fluid coupling or fitting 49 in an end plate 48a, to which is connected a high pressure line 49a for introducing high pressure fluid from an external source. End cap 48 is formed with an inner, U-shaped wall 52 which defines with plate 48a, a plenum chamber 50 therewithin. Wall 52 has vortex fluid injection ports 51 in its upright portions. A rupturable hermetic seal or disc 50a covers the fluid passage in plate 48a.

Separating the interior of casing 46 and chamber 12 in motor 10 is an additive nozzle assembly 53 comprising an entrance screen 54, a hermetic blow out seal 55, and a passageway 41. An igniter 35 with electrical leads for connection to an electrical soucre (not shown) is sealingly installed in assembly 14 to complete the invention as embodied and described in FIGURE 1.

FIGURES 3 and 4 together illustrate another modification of the invention wherein particulated material supply assembly 14 comprises a collapsible tube or container 56 confined within a head end mounted casing 57 and an end cap 58. Container or tube 56 is pre-loaded with the particulated energy enhancing additive material selected from the above-referred to group in a slurry or paste of a viscosity suitable for extrusion through ports 59 in a nozzle 60. Communication between chamber 12 of motor 10 and the interior of container 56 is maintained through hermetically sealed ports 59 and a fluid passage 61 in nozzle 60. A gas generator 62 comprising a suitable propellant charge and an igniter 63 for ignition thereof is sealingly installed in the aft end of chamber 57 (FIGURE 3) or alternatively, in the head end of chamber 57 (FIGURE 4). A set of gas metering ports 64, with associated hermetic seals in the form of fusible plugs 64a are also provided for a purpose to be hereinafter explained. In FIGURE 4, gas generator 62 igniter 63 is provided in end cap 58 as shown.

FIGURE 5 illustrates an additional modification of the invention and is similar in many respects to that of FIGURE 1. Particulated material supply assembly 14 in this form of the invention comprises a container 65 positioned interiorly of casing 46 and is filled with additive material 47 dissolved or otherwise dispersed in a combustible and/or a volatilizable liquid i.e., in a fluidized state. The space surrounding container 65 is substantially evacuated by means of a vacuum pump (not shown) connected to the valve means 20 shown, or can contain atmospheric air or the like as desired. At the aft end of assembly 14 is a slightly modified (over that of FIGURE 1) injection nozzle 53 comprising the hermetic seal, fusible plug or blow out diaphragm 55 and a passageway 66 providing communication between motor 10 chamber 12 interior and the interior of container 65. Metering ports 64 with hermetic seals 64a provide communication between interior of casing 46 and chamber 12. Gas generator 62 and igniter 63 therefor provide a heat source for a purpose to be later indicated.

Figure 6:
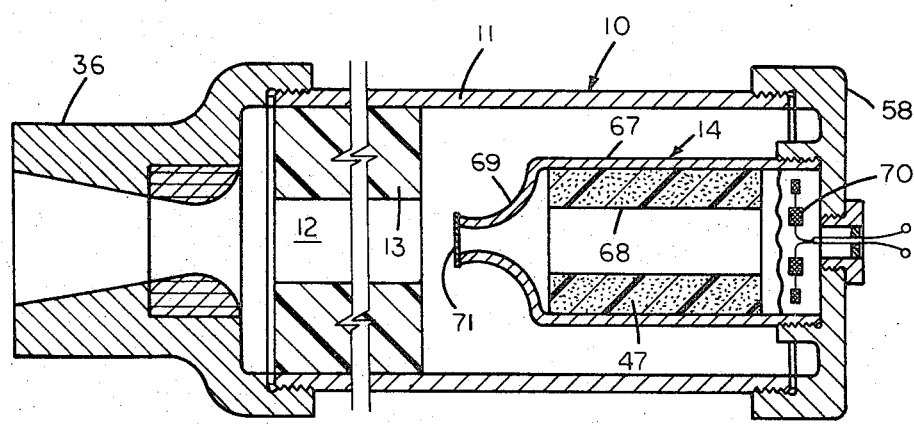
FIGURE 6 is a sectional view of an additional embodiment of the invention illustrative of a fluidization and pressurization means for supplying additives from an internal combustible source.
Figure 8:
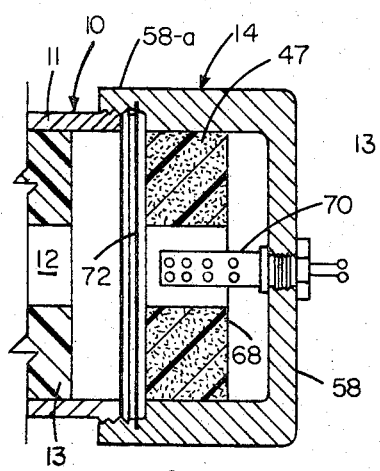
FIGURE 8 is a sectional view of an alternate form of internal (of the casing) combustible fluidization and pressurization source for supplying additives.
Figure 7:
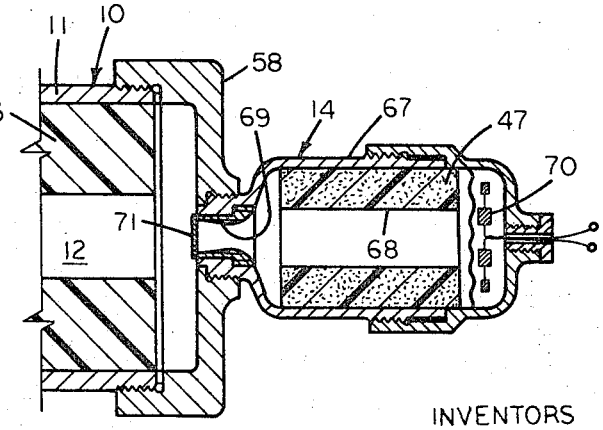
FIGURE 7 is a sectional view of an alternate form of the invention of FIGURE 6 illustrating an external (of the motor casing) combustible source.

FIGURES 6, 7 and 8 are illustrative of further embodiments of the invention wherein motor 10 particulated material supply assembly 14 comprises an auxiliary rocket motor 67 of relatively miniature size. Motor 67 has its own propellant charge 68, exit cone 69, and igniter 70 and is sealingly positioned in the motor 10 head end of casing 11. In the FIGURE 6 form of the invention, auxiliary motor 67 is adapted for mounting entirely within chamber 12 of motor 10 as shown and has a hermetic seal in the form of a rupturable diaphragm or blow out disc 71 provided at the extreme end of exit cone 69. In this embodiment of the invention, additive 47, selected from the hereinbefore enumerated materials is disposed and dispersed in the propellant grain or charge 68, which in turn, is selected for its low temperature burning qualities and its compatibility with the material 47 used. Additives 47 will be transported through exit cone 69 into combustion chamber 12 for energy augmenting purposes (to be later described in connection with operation of this invention) by combustion gases derived from auxiliary propellant grain 68.

In FIGURE 7, secondary or auxiliary motor 67 of supply assembly 14 including its auxiliary grain 68 having material 47 therein is mounted exteriorly of motor 10 chamber 12 or casing 1 by means of a suitable fitting as shown. A hermetic seal such as rupturable blow out disc 71 is again fitted to the extreme end of exit cone 69 in the usual manner and igniter 70 is included as in FIGURE 6.

In the FIGURE 8 invention, supply assembly 14 comprises the secondary or auxiliary propellant charge 68 containing the preselected additives 47 hereinbefore set forth, and which is bonded to the interior of the extended walls 58a of assembly 14. An igniter 70 is sealingly installed in end cap 58 of assembly 14 adjacent main propellant charge 13 of motor 10. A foil-like hermetic seal or diaphragm 72, transversely installed in walls 58a isolates secondary propellant charge 68 from main charge 13 in chamber 12 of motor 10.

For operation of the invention, reference may be had to FIGURE 1, wherein is shown a generally preferred means for carrying out its objects, although under other operative conditions and uses, the other modifications may preferably be utilized. In the FIGURE 1 embodiment gas, preferably combustible gas e.g., hydrogen and the like, is admitted through inlet fitting 49 and pipe 49a and acts against seal 50a rupturing it, and enters plenum chamber 50 filling and pressurizing it. Igniter 35 is then energized to initiate combustion of charge 13. Heat from burning charge 13 fuses or melts fusible plug 55. In the interim, gas from chamber 50 is injected through vortex passages 51 into chamber 46a and fluidizes particulated material 47 in casing 46. These particles are thereafter carried into chamber 12 of rocket motor 10 through the now fully opened injection body 53. The size of particles 47 is preferably maintained below about 10 microns and screen 54 at the entrance of injector body 53 is utilized to insure this. Once in chamber 12, particles 47 are combusted with burning charge 12 and a higher performing rocket motor is achieved.

Operation of the invention of FIGURES 3 and 4 (an alternative arrangement) is based upon pressurization supplied by the gaseous products derived from solid propellant gas generator 62. Hence, the interior of casing 57 is pressurized by the gases produced upon ignition of generator 62 by igniter 63. Part of the gas produced thereby passes into chamber 12 of motor 10 through metering ports 64 after melting hermetic seals or fusible port plugs 64a and ignites propellant charge 13. The remainder of the gas pressurizes the interior of casing 54 and exerts a collapsing force on container 45 thereby forcing or extruding its slurried or paste-like contents, including the combustible energy augmenting particulated material into chamber 12 through passage 61 and extrusion ports 59 in extrusion nozzle 60. The material so extruded enters into combustion with burning charge 13 to create a higher performing rocket motor 10.

In operation of the invention as embodied in FIGURE 5, which in some respects is similar to that of FIGURE 1, the interior of casing 46 usually is first evacuated by means of any well known vacuum system or pumping arrangement (not shown) through the valve means 20 indicated. Igniter 63 is energized, and gas generator 62 thereby ignited, produces gas at elevated temperature and pressure effectively becoming a heat source filling the evacuated space in casing 46. Some of the gas enters metering ports 64 as in FIGURES 3 and 4, melts hermetic seals or fusible port plugs 55a at the end thereof, and passes into chamber 12 to ignite propellant charge 13. Ignited propellant charge 13 produces propelling gas of high temperature and fuses plug 55 at the aft end of passage 66 in the injector assembly 53. Passage 66 communicates with the interior of container 65 which contains particulated additive material 47 in a now highly fluidized, or volatized state, since they were originally dispersed in a volatizable and/or combustible liquid. Gas from generator 62 being at elevated temperature volatilizes the liquid in container 65 raising the pressure therein to force its contents into chamber 12 through passageway 66 in injector 53 where combustion thereof occurs with burning charge 13. There results, or is produced thereby, a higher performing rocket motor 10 as hereinbefore set forth in the previously described embodiments.

Alternatively, the interior of casing 46 need not be evacuated although in most instances this is desirable for best operation. Casing 46 interior can also be precharged with a heat transferring gas, either ignitable or otherwise, i.e., hydrogen, which better effects heating of container 65 and volatilization of its liquid contents. In either or both usages, the skilled artisan will select the best mode, consistent with his own immediate requirements.

In the embodiments of the invention represented in FIGURES 6, 7 and 8 operation proceeds as follows:

Igniter 70 is energized and solid propellant charge 68 is fired to produce gas and pressure. Pressure of the gas destroys hermetic seal 71 (and hermetic diaphragm 72 in FIGURE 8) and the gas enters chamber 12 to ignite propellant charge 13 of motor 10. The propellant charges 68 in motors 10 of FIGURES 6, 7 and 8 have embedded therein the particulated, energy augmenting material 47 previously selected which, upon combustion, will be transported by means of the gaseous products produced thereby to chamber 12 for complete combustion with charge 13. Thus, an improved, higher performing rocket motor 10 is again provided whereby all of the objectives herein set forth are readily achieved.

In addition to the invention in its several embodiments set forth herein what is additionally presented and described and sought to be protected by Letters Patent is a novel process for operating an improved solid propellant rocket motor of high energy output and performance which consists of providing a solid propellant charge in a casing, igniting said charge, supplying minute particles or ignitable metallic and/or metalloid material entrained in a fluid medium to the ignited propellant for combustion therewith to obtain increased high temperature gases, and exhausting the combined gaseous products through an exit cone for production of thrust. In addition, the process includes the supplying of the energy augmenting particles from means contained within or integrated with the motor.

Other embodiments of the novel invention described herein and the method disclosed for carrying it out will occur to one skilled in the art to which it pertains after perusal hereof. Therefore, no undue limitations are to be placed upon it except in accordance with the scope of the subtended claims.

What is claimed is:

1. A high performance rocket motor having aft and head ends and a main casing containing a main solid propellant charge and a combustion chamber, an exit nozzle attached to the aft end of said motor on said casing, an ignition device mounted on said motor for igniting said charge, and a separable, high energy particulated material containing assembly mounted on the head end of said motor on said casing said assembly comprising:

a substantially cylindrical, fluid pressurizable, auxiliary casing defining an auxiliary chamber, said auxiliary chamber containing said particulated material in a fluidizable state;

an end cap sealingly atttached to said auxiliary casing forming the head end of said motor and a closure for said auxiliary chamber;

means for fluid pressurizing said auxiliary casing chamber;

means in said auxiliary casing including at least one fluid passageway terminating in said motor combustion chamber for conveying said fluidized particulated material from said auxiliary casing interior to said motor combustion chamber; and destructable hermetic seal means in said conveying means whereby said fluidized material is prevented from entry into said combustion chamber until a predetermined fluid pressure is reached in said auxiliary casing chamber.

2. The motor of claim 1, wherein the auxiliary casing end cap includes an aftwardly extending U-shaped wall and a hermetically sealed fluid passageway containing plate defining a plenum chamber therebetween, and a fluid fitting attached to said plate for supplying fluid under pressure to said plenum chamber, said U-shaped wall having a plurality of vortex fluid passages therethrough.

3. The motor of claim 1 wherein said particulated material containing assembly auxiliary casing has a pressure collapsible container in its interior and said particulated material is contained therein in extrudable, slurried form, means in said auxiliary casing for generating fluid under pressure to collapse said container and expel its slurried contents, and said conveying means fluid passageway connects said collapsible container interior with said main chamber for combustion therein of said slurried contents with said main propellant charge.

4. The motor of claim 3 wherein said container contents are in the form of an extrudable paste.

5. The motor of claim 1 wherein said assembly auxiliary casing has a volatilizable liquid container in its interior, said liquid having said high energy particulated material suspended therein, means for generating high temperature gas for volatilizing said liquid, and said conveying means fluid passageway connects said container interior with said combustion chamber for combustion therein of said container contents, with said main propellant charge.

6. The motor of claim 1 wherein said assembly auxiliary casing has an auxiliary solid propellant charge in its interior, said auxiliary charge including in a dispersion throughout its mass said high energy particulated material, means for igniting said auxiliary charge, and said conveying means fluid passageway is a nozzle for passage of the products of combustion of said auxiliary charge and said particulated material to said chamber for combustion therein.

7. The motor of claim 1 wherein the high energy particulated material is a metal selected from the group consisting of aluminum, magnesium, zirconium, nickel, lithium, sodium, potassium, titanium, beryllium, zinc, iron manganese, vanadium, copper, chromium, hafnium, rubidium, strontium, calcium, barium and alloys thereof.

8. The motor of claim 1 wherein the high energy particulated material is a metalloid selected from the group consisting of carbon, boron, tellurium, silicon, selenium, sulfur and phosphorous.

9. The motor of claim 6 wherein the conveying means fluid passageway is substantially unrestricted with respect to the flow of fluidized particulated material therethrough and said hermetic seal means is transversely positioned across the interior of said auxiliary casing.

References Cited
UNITED STATES PATENTS

| | | | |
|---|---|---|---|
| 2,968,917 | 1/1961 | Whaley | 60—207 |
| 3,073,113 | 1/1963 | Faught | 60—39.47 X |
| 3,112,609 | 12/1963 | Bridgforth | 60—216 |
| 3,122,429 | 2/1964 | Toulmin | 60—39.47 X |
| 3,158,997 | 12/1964 | Blackman et al. | 60—251 |
| 3,159,104 | 12/1964 | Hodgson | 102—98 |
| 3,173,252 | 3/1965 | Ziegenhagen | 60—255 |
| 3,287,912 | 11/1966 | Wehlow et al. | 60—256 |

CARLTON R. CROYLE, *Primary Examiner.*